United States Patent [19]
Takeuchi

[11] 3,942,151
[45] Mar. 2, 1976

[54] DEVICE FOR PREVENTING DRUNKEN DRIVING OF VEHICLE

[75] Inventor: Yasuhisa Takeuchi, Yokosuka, Japan

[73] Assignee: Nissan Motor Co., Ltd., Japan

[22] Filed: Oct. 10, 1973

[21] Appl. No.: 405,139

[30] Foreign Application Priority Data
Oct. 14, 1972  Japan............................. 47-103018

[52] U.S. Cl.................... 340/53; 180/99; 307/10 R; 317/134; 340/279
[51] Int. Cl.²........................................ B60R 25/04
[58] Field of Search......... 340/53, 63, 64, 223, 279; 307/10 AT; 317/134; 180/99; 235/92 NG, 92 SH, 150.2

[56] References Cited
UNITED STATES PATENTS

| | | | |
|---|---|---|---|
| 3,054,059 | 9/1962 | Ingerman | 235/92 NG |
| 3,083,907 | 4/1963 | Crocker et al. | 235/92 SH |
| 3,312,508 | 4/1967 | Keller et al. | 340/279 |
| 3,350,708 | 10/1967 | Adler | 235/92 NG |
| 3,610,943 | 10/1971 | Jones | 307/10 AT |
| 3,723,967 | 3/1973 | Atkins et al. | 340/64 |
| 3,755,776 | 8/1973 | Kotras | 340/63 |
| 3,788,422 | 1/1974 | Bowler | 340/63 |
| 3,812,403 | 5/1974 | Gartner | 307/10 AT |

*Primary Examiner*—John W. Caldwell
*Assistant Examiner*—Joseph E. Nowicki
*Attorney, Agent, or Firm*—Robert E. Burns; Emmanuel J. Lobato; Bruce L. Adams

[57] ABSTRACT

An electric circuitry tests the memory and visual capabilities of a driver shutting off the engine if he fails in the test. Digits are flashed one at a time at random on a screen for the driver to memorize. A full set of digits is then flashed in numerical order one at a time for the driver to press a button when each of the memorized digits reappears on the screen.

7 Claims, 15 Drawing Figures

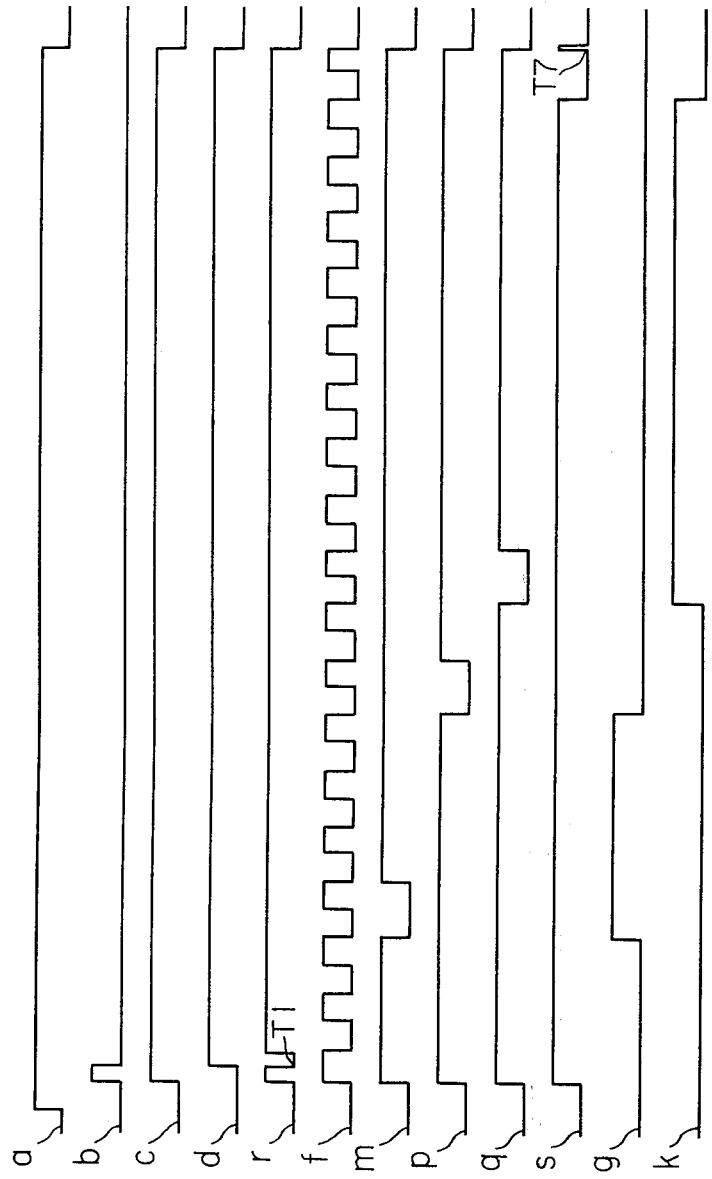

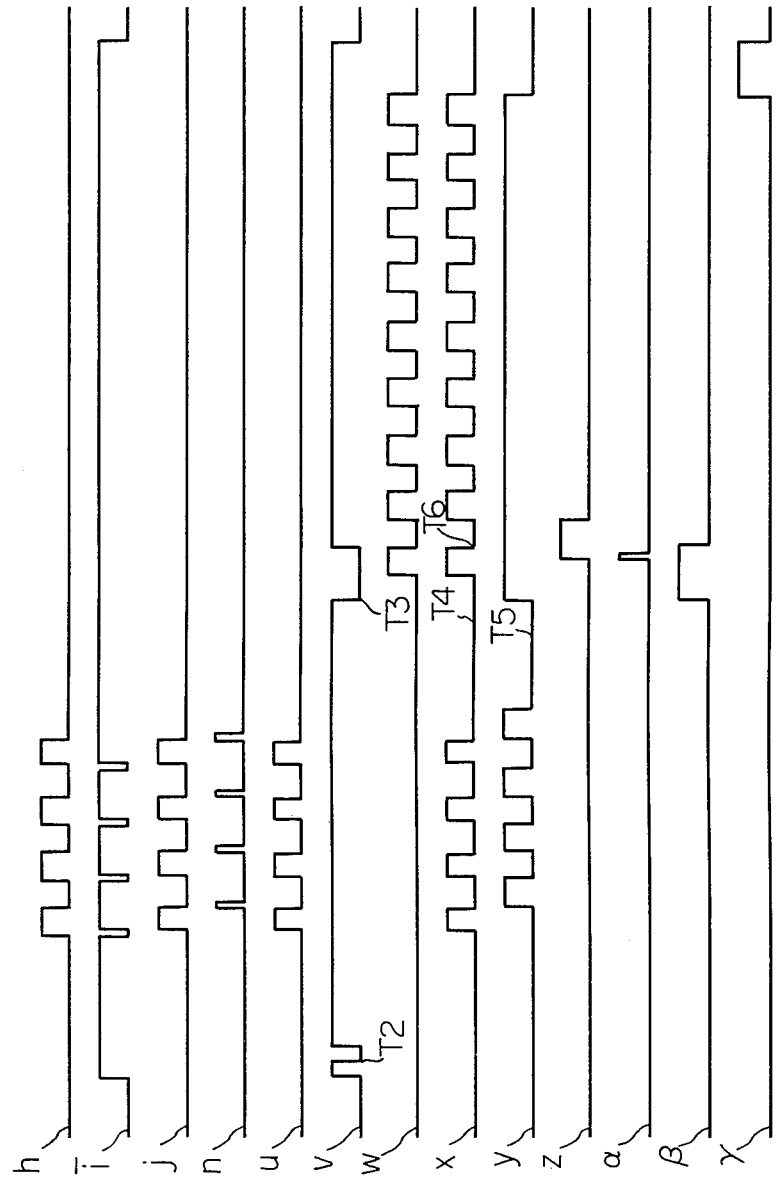

DEVICE FOR PREVENTING DRUNKEN DRIVING OF VEHICLE

This invention relates to a safety device for a vehicle, and more particularly to a device for preventing drunken driving of a vehicle.

Serious hazards are entailed when road vehicles or aircrafts are driven or piloted by persons who are drunk or overfatigued, often causing serious accidents.

Heretofore methods and systems have been proposed for inhibiting drunken operators or drivers from driving vehicles, wherein the operators or drivers have to take physiological tests, of, for example, memory, visual acuity, time and accuracy in choice decisions and others, and are permitted to drive their vehicles only when they have passed all these tests, e.g., using plural input keys for depressing when the driver memorizes numbers or characters previously presented.

It is an object of the present invention to provide a device for preventing drunken driving of a vehicle which has only one input key for indicating each of some random digits presented to the driver or examinee at a predetermined interval when the digits all reappear for recognition at an interval.

It is another object of the present invention to provide a device for preventing drunken driving of a vehicle which occupies only a small space in a vehicle.

In order to achieve these purposes, the present invention provides a control circuit for manually and electrically manipulating the intended device, a counting circuit for providing series of binary digits at random, a ring counter circuit for providing a plurality of digits for examining the examinee, a ring counter control circuit for controlling the ring counter circuit, a random memory circuit for memorizing the digits provided at random and generated for examining the examinee, a digit indicator for displaying the series of digits for the examination of the examinee and also for confirming correct or incorrect memorization of the examinee, an examining circuit for examining the examinee to energize a relay when the examinee passes the examination to close the relay to supply power from a source to the electric system of the vehicle, a signal holding circuit for holding the correct passage of the examination even after the ignition key is opened for a predetermined duration, and a constant voltage cut-off circuit for switching off the voltage after the completion of the examination by the device.

These and other objects, features and advantages of the present invention will become more apparent from the following description taken in conjunction with the accompanying drawings, in which.

Figure 4:
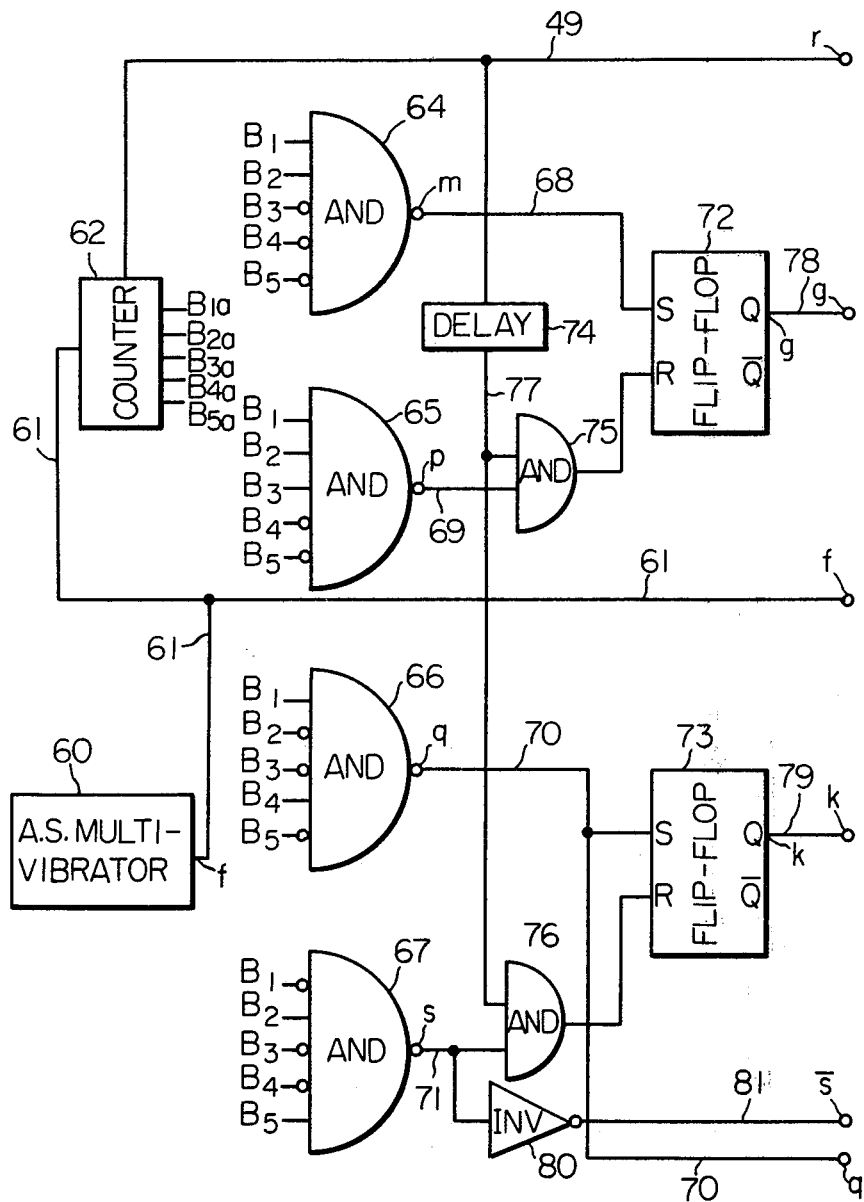
Figure 5:
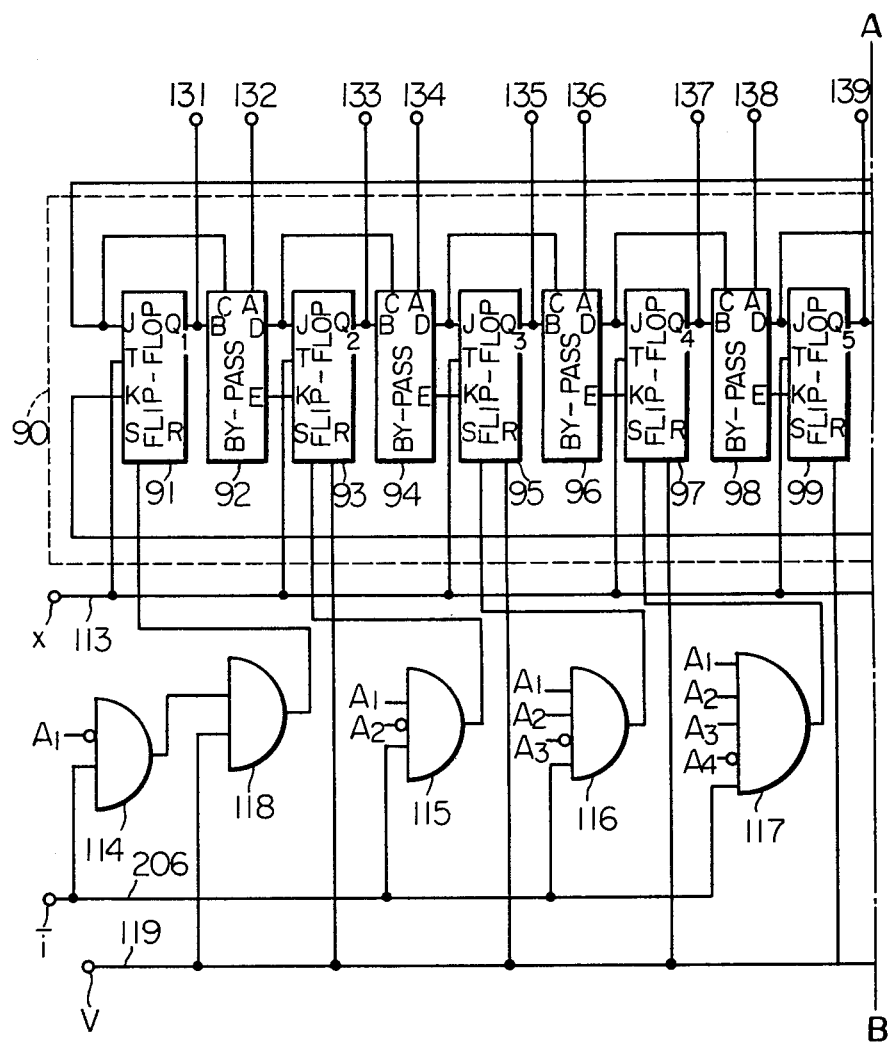
Figure 5:
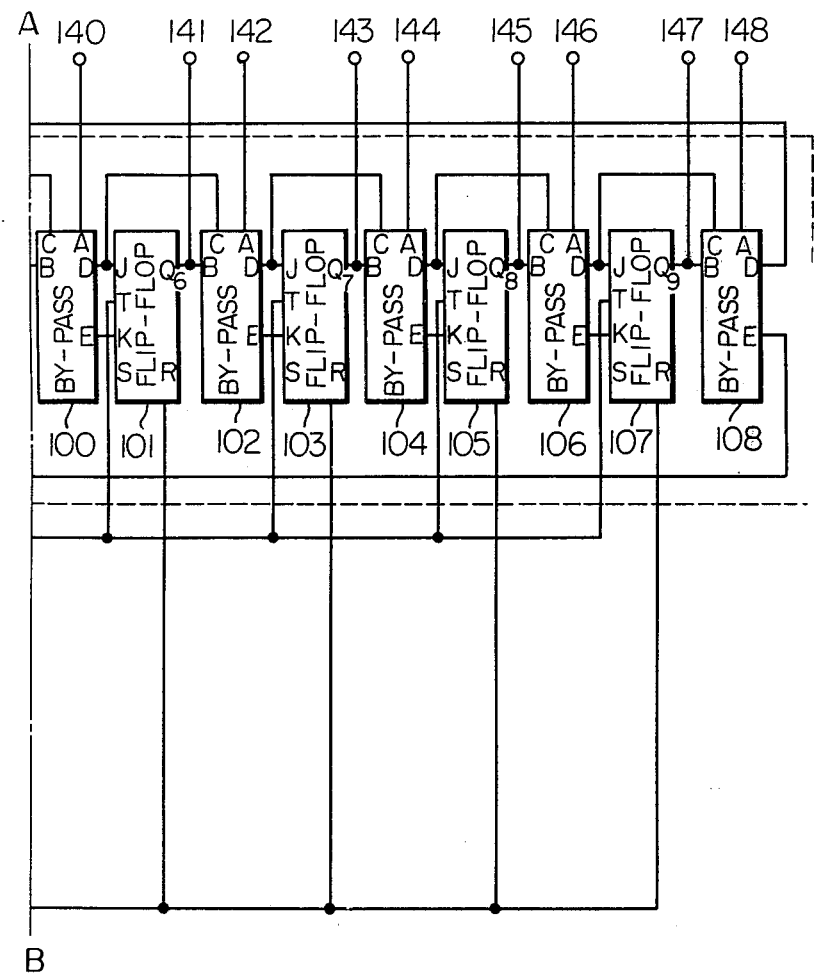
Figure 6:
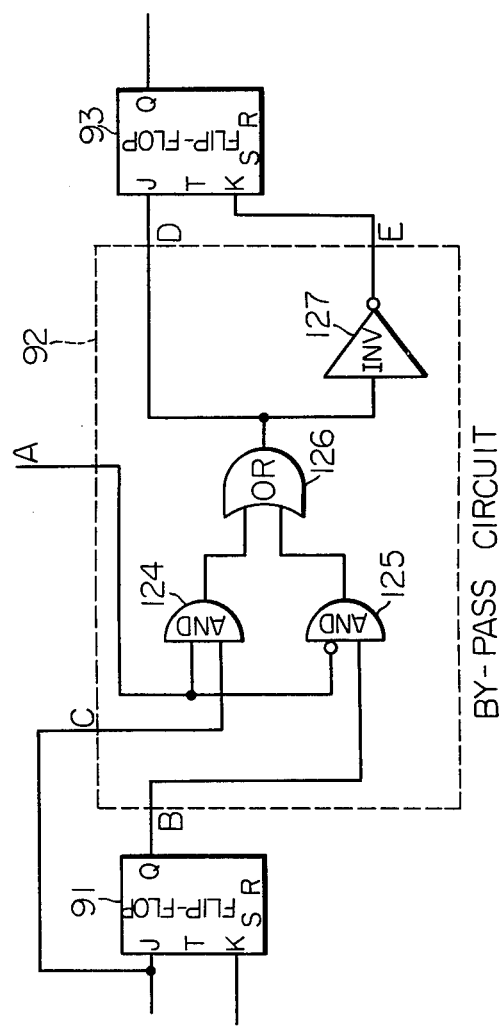
Figure 7:
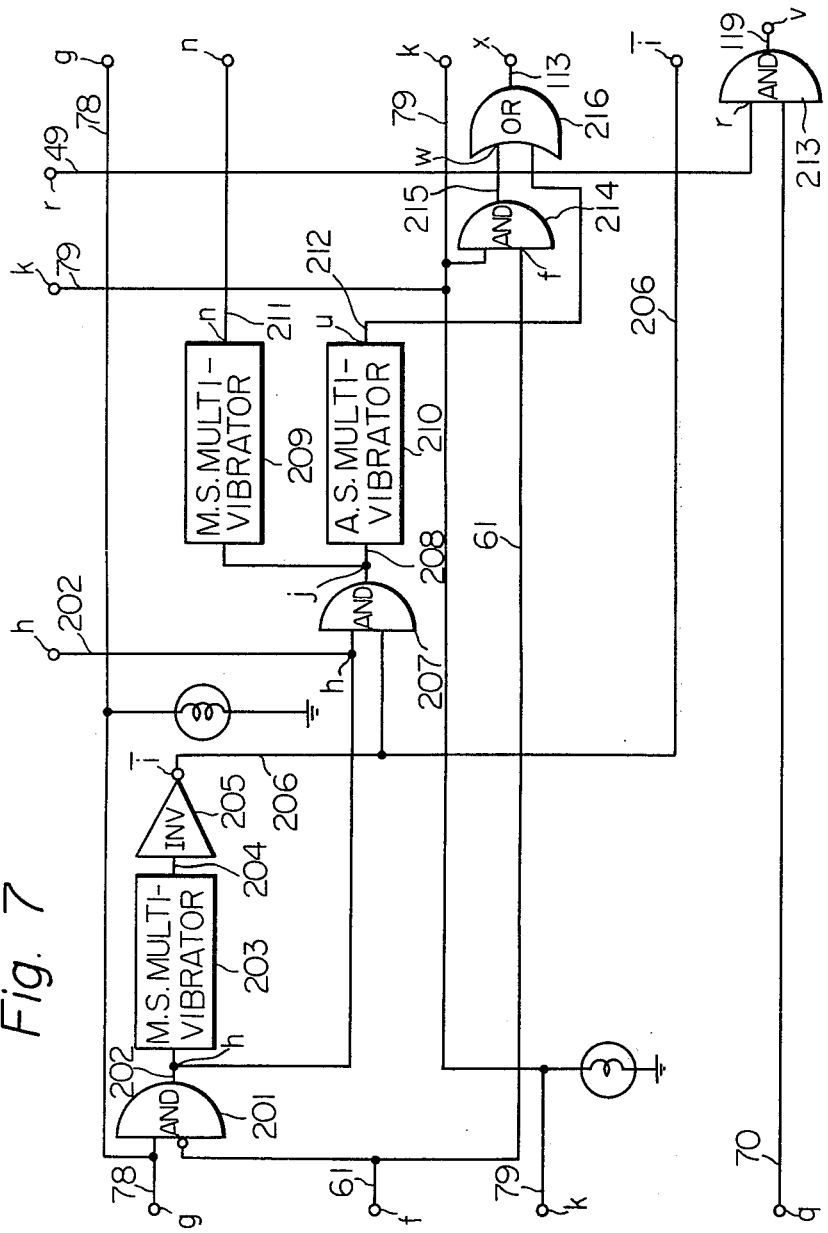
Figure 8:
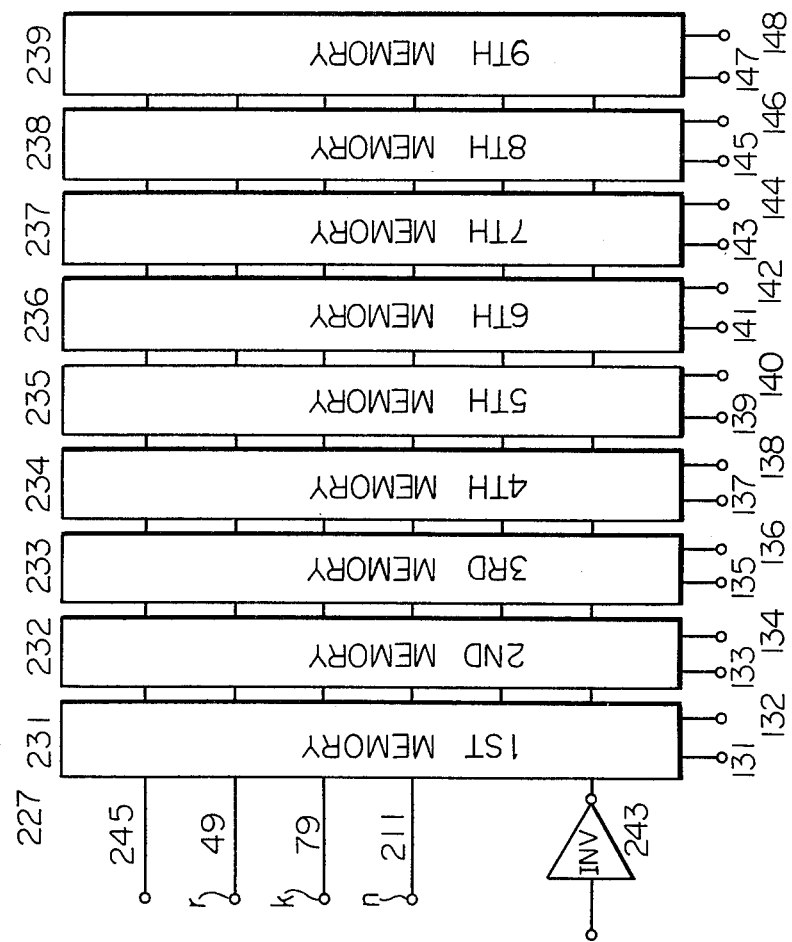
Figure 9:
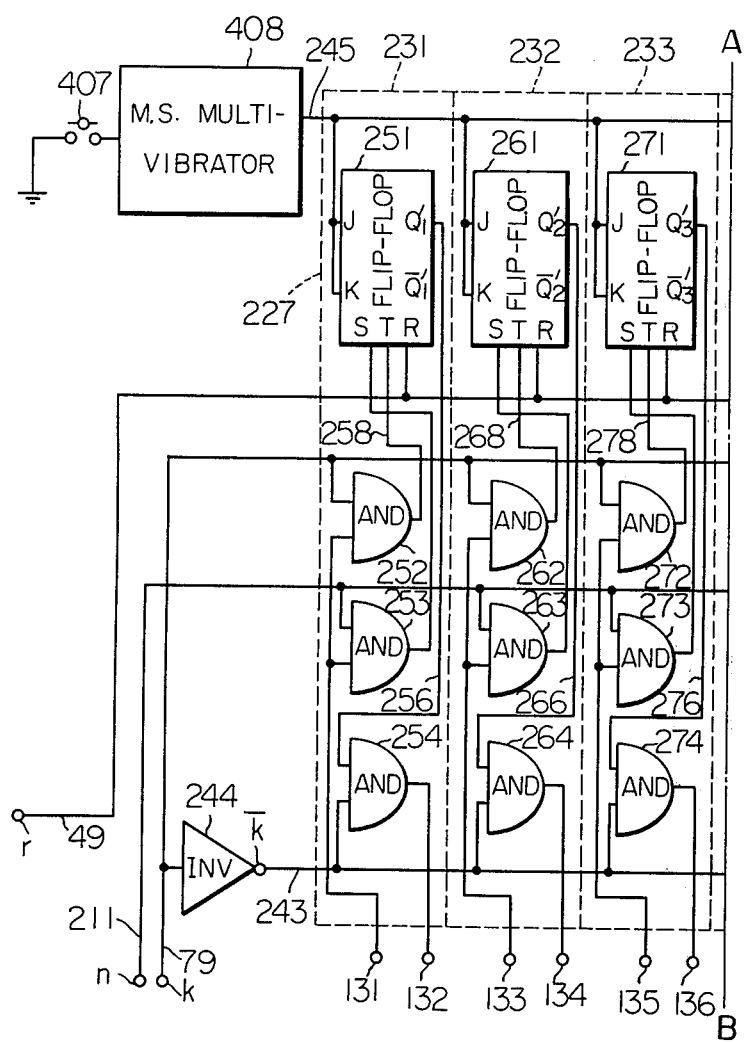
Figure 9:
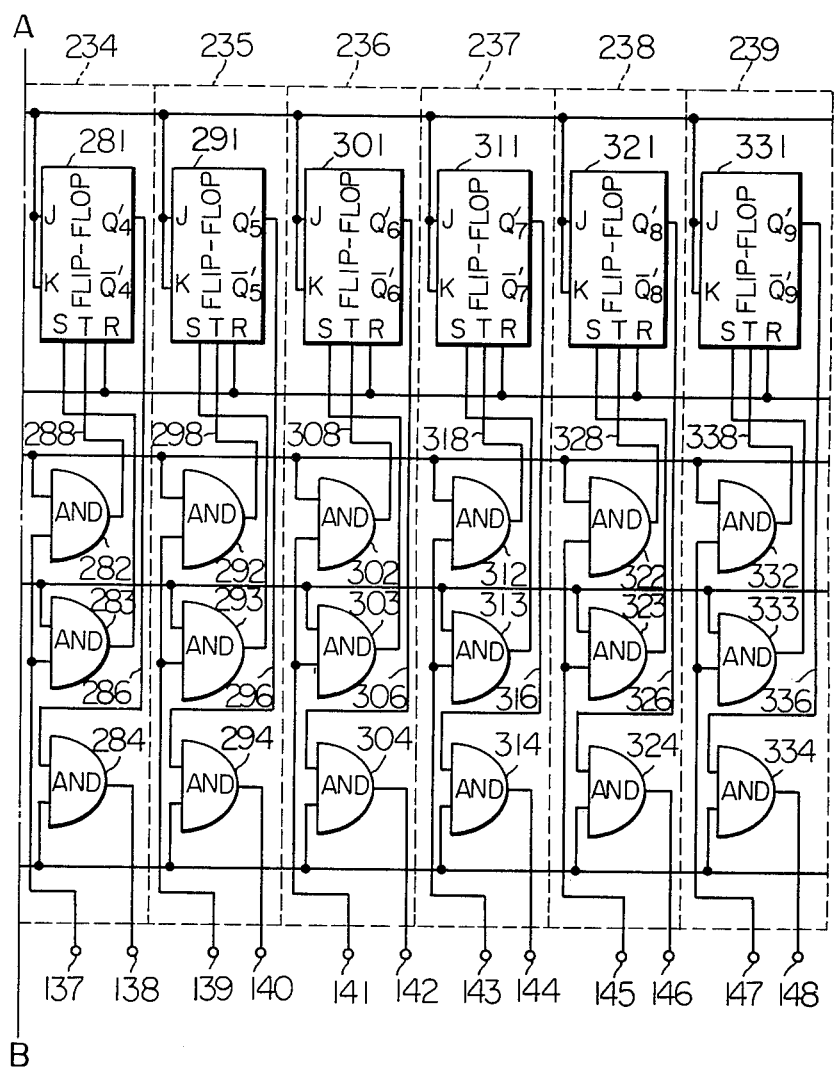
Figure 10:
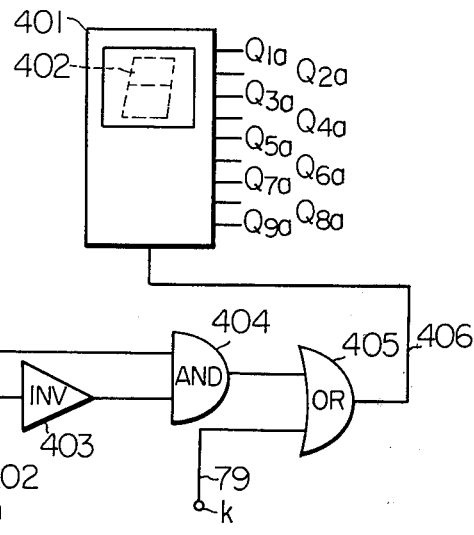
Figure 11:
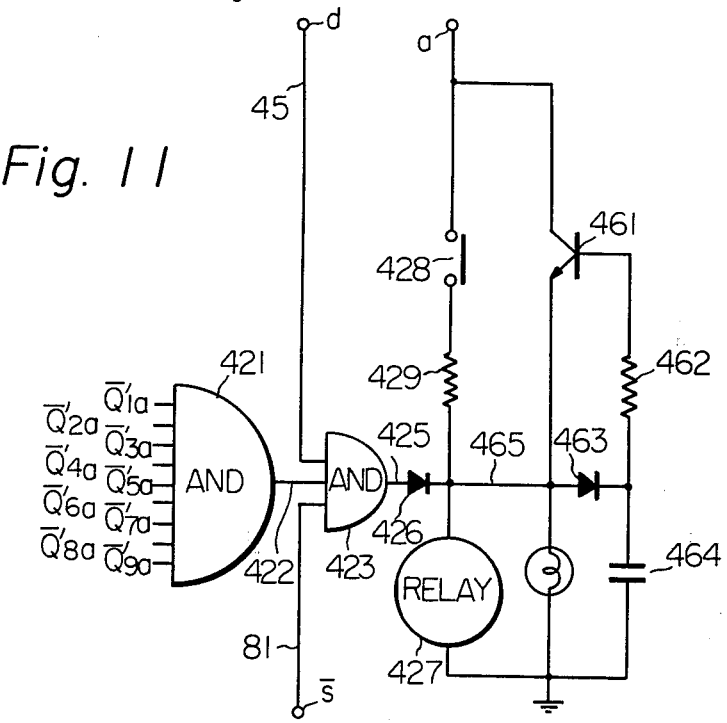
Figure 12:
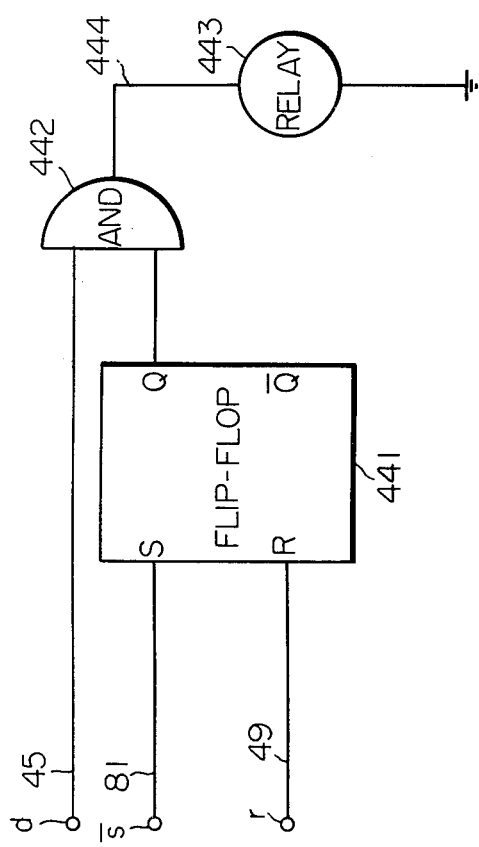

FIGS. 3(a) and 3(b) are a waveform representation of the respective essential parts of the circuit arrangement of a device of the present invention illustrating the operation thereof;

FIG. 4 is a circuit diagram of a preferred example of a counting circuit of a device of the invention;

FIGS. 5(a) and 5(b) are a circuit diagram of a preferred example of a ring counter circuit of a device of the invention;

FIG. 6 is a circuit diagram of part of the ring counter circuit shown in FIG. 5 illustrating the operation thereof;

FIG. 7 is a circuit diagram of a preferred example of a ring counter control circuit of a device of the invention;

FIG. 8 is a schematic view of a random memory circuit of a device of the invention;

FIGS. 9(a) and 9(b) are a detailed structural circuit diagram of a random memory circuit of a device of the invention;

FIG. 10 is a circuit diagram of a preferred example of a digit indicator of a device of the pres present invention;

FIG. 11 is a circuit diagram of preferred examples of an examining circuit and a signal holding circuit used in a device of the present invention; and FIG. 12 is a circuit diagram of a preferred example of a constant voltage cut-off circuit of a device of the invention.

Figure 1:
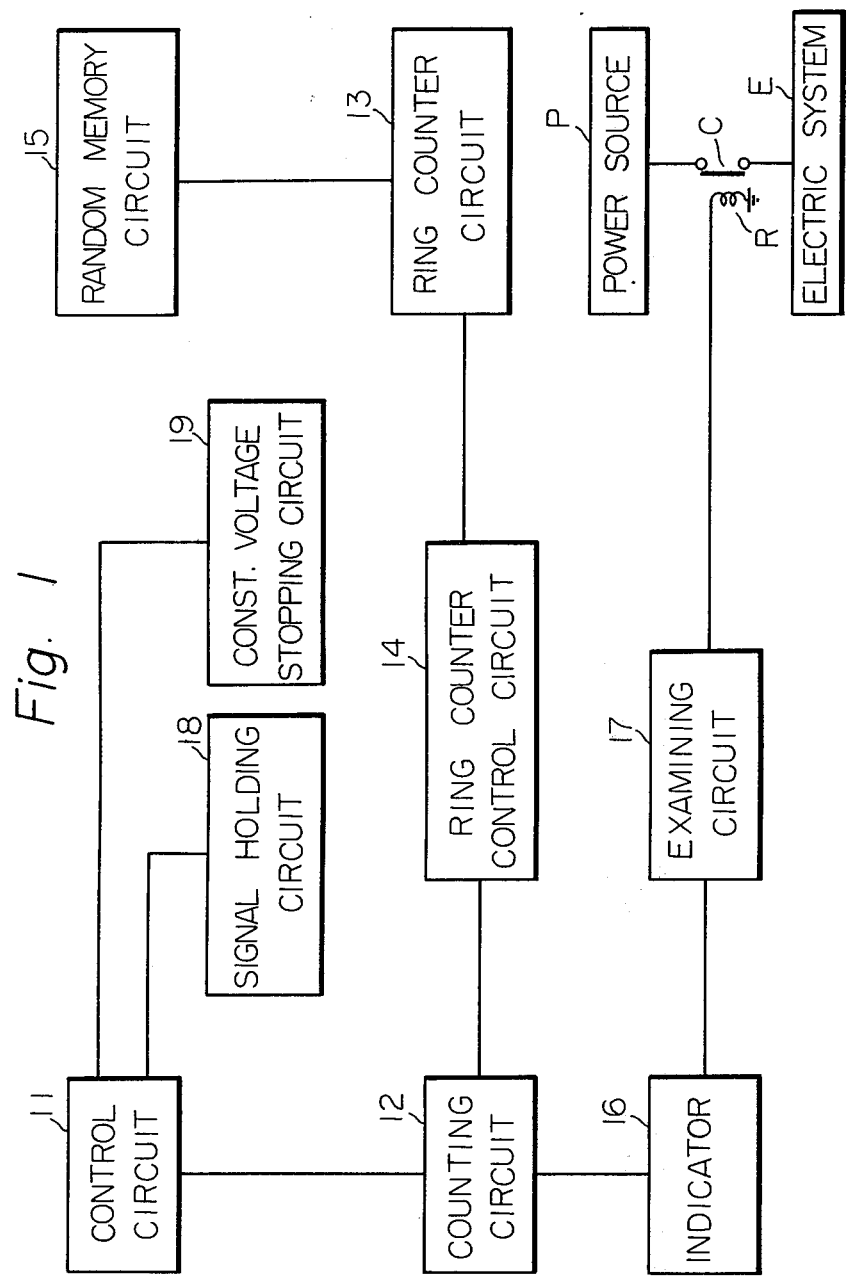
FIG. 1 is a schematic block diagram of a device for preventing drunken driving of a vehicle in accordance with the invention.

Reference is now made to the drawings, and particularly to FIG. 1, which shows a block diagram of a device for preventing drunken driving of a vehicle according to the present invention.

The device for preventing drunken driving of a vehicle of the present invention comprises a control circuit 11 for manually and electrically manipulating the device, a counting circuit 12, a ring counter circuit 13, a ring counter control circuit 14 for controlling the ring counter circuit 13, a random memory circuit 15 for memorizing a series of random digits generated for examining the driver or examinee, an indicator 16 for displaying four digits for the examination of the driver or examinee and also for confirming correct or incorrect memorization of the driver or examinee, an examining circuit 17 for examining the driver or examinee to energize a relay coil R when the driver or examinee passes the examination by this device successfully to close a switch C of the relay R in order to connect a power source P of the vehicle to an electric system E of the vehicle, a signal holding circuit 18 for holding the signal of successfully passing the examination even after an ignition key is opened for up to a predetermined duration, and a constant voltage cut-off circuit 19 for switching off the voltage after completion of the examination by the apparatus.

Figure 2:
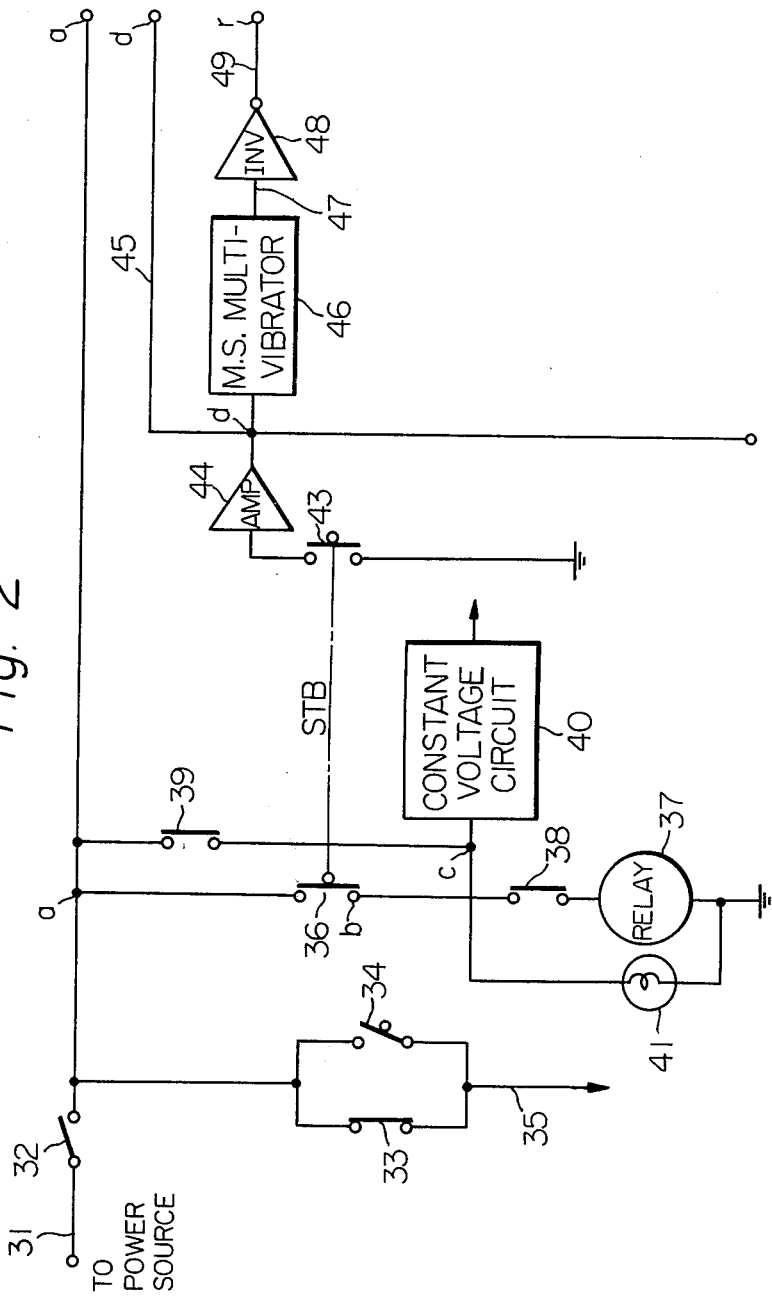
FIG. 2 is a circuit diagram of a preferred example of a control circuit in a device of the present invention.

Referring now to FIG. 2, which shows a detailed circuit arrangement of the control circuit in the apparatus for preventing drunken driving of a vehicle of this invention, a line 31 is connected to a power source such as a battery or dynamotor of a vehicle and is also connected to an ignition switch 32. Numeral 33 indicates a relay switch, which will be hereinafter described in greater detail and which will close when an examinee operates the device of this invention successfully, and which connects the ignition switch 32 and the power source to a line 35 which is connected to the electric circuits and devices of the vehicle necessary for operating the engine and for driving the vehicle. Furthermore, a transmission position sensing switch 34 is connected in parallel with the relay switch 33 and is closed only when the transmission is set in the neutral or parking position. When the relay switch 33 and transmission position sensing switch 34 are thus connected, even if the driver or examinee does not pass the examination or test for drunkenness, overfatigue or drugged condition by the present device and if the transmission is shifted to its neutral or parking position, the vehicle engine can be started and can also be idled, because the transmission position sensing switch 34 is closed so that current flows through the transmission position sensing switch 34 and line 35 to the electric systems of the engine and vehicle even if the relay switch 33 is open before the driver or examinee is tested by the present device. Therefore, even if the driver or examiner has not passed the examination by the present device, the vehicle engine can be warmed up and the vehicle cabin can be warmed up or cooled. However, if the transmission is shifted from the neutral or parking position to a drive position when the driver or examinee has not passed the examination by the present device, the sensing switch 34 opens, and the vehicle engine is shut off so that the vehicle cannot be driven, because both the transmission position sensing switch 34 and the relay switch 33 are open with the result that no power is supplied therethrough and through the line 35 to the electric systems of the engine and the vehicle. If the driver or examinee successfully passes the examination by the present invention, the relay switch 33 is closed as will be hereinafter described in greater detail, and, accordingly, power is supplied from the power source of the vehicle through the switch 33 to the electric systems of the engine and vehicle with the result that the vehicle can be driven. A test starting pushbutton STB is connected to the ignition switch 32 at one switch 36 thereof. This switch 36 is closed when the test starting pushbutton STB is manually pressed, and as will be hereinafter described in greater detail, the test for evaluating the drunken, overfatigued or drugged condition of the driver or examinee is started. A normally closed relay switch 38 connects the switch 36 to a grounded relay or relay coil 37. A switch 39 of the relay 37 is connected in parallel with the switch 36, and is closed when the relay coil 37 is energized to self-hold the relay 37. A lamp 41 is connected in parallel with the switch 38 and relay coil 37 to indicate that the examination of the apparatus has started when the lamp is lit, by closing the switch 36 of the test starting pushbutton STB when the pushbutton STB is depressed. The circuit of the switch 36, relay coil 37, normally closed switch 38 and switch 39 of the relay 37 is thus energized, when the test starting pushbuttom STB is once depressed the voltage at the point $c$ between the switch 39 and the switch 38 is maintained at the voltage of the power source.

The test starting pushbottom STB also has another switch 43 mechanically interconnected to the switch 36 thereof and operated in the same manner, i.e., to close when the pushbutton is depressed. The switch 43 is grounded and also connected to the input of an amplifier 44 at its other end.

In the circuit thus arranged, the voltage at a junction point $d$ at the output of the amplifier 44 is low and will hereinafter be characterized by "0", when the test starting pushbutton STB is depressed so that the contact 43 thereof is closed, and is high, which will hereinafter be characterized by "1", when the test start pushbutton STB is not depressed so that the contact 43 thereof remains open.

Referring to FIGS. 3($a$) and 3($b$), which shows signal waveforms at the essential points of the circuit arrangement of the apparatus of the present invention in terms of time when the starting button is depressed, and wherein the high level illustrates the 1 state, while the low level shows the 0 state of the signal waveforms. The signal waveform $a$ in FIG. 2 becomes 1 when the ignition switch 32 is closed, the signal waveform $b$ in FIG. 2 becomes 1 when the test starting switch STB is depressed, and the signal waveform $c$ in FIG. 2 represents the voltage between the switch 39 of the relay 37 and the switch 38 as has been heretofore described, and the signal waveform $d$ in FIG. 2 represents the voltage at the output of the amplifier 44 as has been heretofore described.

Returning to FIG. 2, the output of the amplifier 44 is connected to the input of a first monostable multivibrator 46 which functions to generate an output voltage 1 fed to an output line 47 thereof for a predetermined period from the moment the input voltage d thereof is changed from 0 to 1. The output line 47 of the multivibrator 46 is connected to the input of an inverter 48 which operates to invert the polarity of the input voltage thereof and accordingly the final output voltage of the multivibrator 46 from the high voltage 1 to the low voltage 0 and vice versa at the output and fed to a line 49 thereof as illustrated by $r$ in FIG. 3($a$).

Reference is now made to FIG. 4, which shows the circuit arrangement of a counting circuit in the device of the present invention.

Numeral 60 designates an astable or free-running multivibrator which generates or oscillates square signal waveforms $f$ in FIG. 3($a$) fed to its output line 61 when connected to the power source. The output of the astable multivibrator 60 is applied by way of the line 61 to the input of a counter 62. To this counter 62 is fed a reset input by way of the line 49 from the output of the inverter 48 in FIG. 2 of the control circuit in such a manner that the counter 62 is reset to zero when the reset input to the counter 62 changes from 1 to 0, and accordingly the counter 62 is reset to zero at the time T1 in FIG. 3($a$) in the signal of waveform $r$.

The counter 62 has five output terminals B1$a$, B2$a$, B3$a$, B4$a$ and B5$a$, and the states of these terminals are designated by 0 and 1 in a manner that the terminal B1$a$ corresponds to the first digit position of the number represented in a binary system of notation, B2$a$ corresponds to the second digit position, B3$a$ corresponds to the third digit position, B4$a$ corresponds to the fourth digit position, and B5$a$ corresponds to the fifth digit position thereof. The counter 62 counts when the input from the astable multivibrator 60 to the counter 62 by way of the line 61 varies from 1 to 0. The respective output terminals B1, B2, B3, B4 and B5 of the counter 62 are connected to the respective input terminals B1, B2, B3, B4 and B5 of AND gates 64, 65, 66 and 67, respectively. The respective AND gates have output lines 68, 69, 70 and 71, respectively, and the signal waveforms m, p, q and s of the outputs of the AND gates 64, 65, 66 and 67, respectively, are shown in FIG. 3($a$). In FIG. 4, the inputs of these AND gates to which marks "o" are attached illustrate that the signals are inverted states of 0 and 1. Therefore, the output of the AND gate 64 becomes B1 × B2 × $\overline{B3}$ × $\overline{B4}$ × $\overline{B5}$, the output of the AND gate 65 becomes B1 × B2 × B3 × $\overline{B4}$ × $\overline{B5}$, the output of the AND gate 66 becomes B1 × $\overline{B2}$ × $\overline{B3}$ × B4 × $\overline{B5}$, and the output of the AND gate 67 becomes $\overline{B1}$ × B2 × $\overline{B3}$ × $\overline{B4}$ × B5.

The output of the AND gate 64 is connected by way of a line 68 to the set (S) input of a first flip-flop 72, which operates in a manner that when the input changes from 1 to 0, the output Q of the flip-flop 72 becomes 1. Similarly, the output of the AND gate 66 is connected by way of the line 70 to the set (S) input of a second flip-flop 73, which operates in a manner that when the input changes from 1 to 0, the output Q of the flip-flop 73 becomes 1.

The output of the inverter 48 in the signal waveform r in FIG. 3(a) is applied to a delay circuit 74 which delays the output signal r a very short predetermined time, and is applied to a respective one of the inputs of AND gates 75 and 76 by way of a line 77. The output of the AND gate 65 is connected by way of a line 69 to the other input of the AND gate 75, and, similarly, the output of the AND gate 67 is connected by way of a line 71 to the other input of the AND gate 76. The output of the AND gate 75 is connected to the reset (R) input of the flip-flop 72, which operates in a manner that when the reset input changes from 1 to 0, the output Q of the flip-flop 72 becomes 0, and, similarly, the output of the AND gate 76 is connected to the reset (R) input of the flip-flop 73, which operates in a manner that when the reset input changes from 1 to 0, the output Q of the flip-flop 73 becomes 0. The signal waveforms at the output lines 78 and 79 of the flip-flops 72 and 73, respectively, are shown by g and k, respectively, in FIG. 3(a). When the output signal of the waveform g of the flip-flop 72 is 1, four digits are displayed in an indicator, and when the output signal of waveform k of the flip-flop 73 is 1, the digits 1, 2, ... 9 are sequentially displayed in the indicator, as will be hereinafter described in greater detail.

In the circuit arrangement of the counting circuit, the delay circuit 74 will operate as follows: Assuming that this delay circuit 74 does not exist, therein, in cases, for example, where the output of the AND gate 65 connected to the input of the AND gate 75 remains 0 because the counter 62 is not yet completely reset by the output signal of waveform r of the inverter 48 at the time T1 in FIG. 3(a), even if the reset signal r from the inverter 48 is applied to the input of the AND gate 75 by way of the line 77, the reset output of the AND gate 75 is not applied to the reset (R) input of the flip-flop 72 with the result that the flip-flop 72 is not reset. For this reason the delay circuit 74 is used for supplying a delayed reset signal r to the input of the AND gate 75, after the counter 62 is completely reset by the reset signal r by way of the line 49 and accordingly the output of the AND gate 65 connected to the input of the AND gate 75 becomes 1.

Referring ot FIGS. 5(a), 5(b) and 6, which show a circuit arrangement of the ring counter circuit used in the device of the present invention for sequentially displaying four digits at random and at predetermined intervals in the indicator in such a manner that the series of four digits does not include the same digit twice in one series. The ring counter circuit 90 has nine flip-flops 91, 93, 95, 97, 99, 101, 103, 105 and 107, and nine by-pass circuits 92, 94, 96, 98, 100, 102, 104, 106, and 108.

Each flip-flop operates in a manner that when 1 is applied to a terminal T thereof as will be hereinafter described in greater detail, if 1 is once applied to a terminal K thereof while 1 is fed to a terminal Q or if 1 is once applied to a terminal J while 0 is fed to the terminal Q, the state at the terminal Q thereof is changed if the stage at the terminal T is changed from 1 to 0.

Referring to FIG. 6, which shows part of the ring counter circuit 90 for illustration of the operation of the by-pass circuit, the signal applied to the input terminal J of the flip-flop 91 is also applied by way of a terminal C of the by-pass circuit 92 to one input of an AND gate 124 of the by-pass circuit 92, and the output from a terminal Q1 of the flip-flop 91 is applied by way of a terminal B of the by-pass circuit 92 to one input of an AND gate 125. A signal is also applied by way of the terminal A of the by-pass circuit 92 to the respective other inputs of the AND gates 124 and 125, as will be hereinafter described in greater detail. The signal input of the AND gate 125 marked by o is inverted at the output thereof. The outputs of the respective AND gates 124 and 125 are applied to an OR gate 126. The output of the OR gate 126 is connected by way of a terminal D of the by-pass circuit 92 to the input terminal J of the flip-flop 93 and is also connected to the input of an inverter 127, and the output of the inverter 127 is connected through a terminal E of the by-pass circuit 92 to the input terminal K of the flip-flop 93. The other by-pass circuits 94, 96, 98, 100, 102, 104, 106 and 108 are also connected by similar arrangements.

In the circuit arrangement of the ring counter circuit 90, the output signals at the terminals D and E of the by-pass circuits can be represented by the following formulae in terms of the input signals at the terminals A, B and C thereof:

$$D = A \times C + \bar{A} \times B \tag{1}$$

$$E = \bar{D} \tag{2}$$

Therefore, when $A = 0$ and according 0 is applied by way of the terminal A of the by-pass circuit 92 to the respective inputs of the AND gates 124 and 125, $$D = B$$
$$E = \bar{B}$$

And, when $A = 1$, and accordingly 1 is applied by way of the terminal A of the by-pass circuit 92 to the respective inputs of the AND gates 124 and 125, $$D = C$$
$$E = \bar{C}$$

Consequently, when $A = 0$ in the by-pass circuit 92, the terminal b is directly connected internally to the terminal D, and the terminal E is inversely connected to the terminal B of the by-pass circuit 92. When $A = 1$, the terminal C is directly connected internally to the terminal D, and the terminal E is inversely connected to the terminal C of the by-pass circuit 92, and, accordingly, when $A = 1$, the flip-flop 91 is by-passed.

Turning back to FIGS. 5(a) and 5(b), in the state that 0 is applied to the terminals A of all the by-pass circuits 92, 94, 96, 98, 100, 102, 104, 106 and 108, only the terminal Q1 of the flip-flop 91 is set to 1, and terminals Q2, Q3, . . . Q9 of the other flip-flops 91, 93, 95, 97, 99, 101, 103, 105 and 107 are set to 0, as will be hereinafter described in greater detail. Then, when the input signal x to all the terminals T of the flip-flops 91, 93, 95, 97, 99, 101, 103, 105 and 107 is changed from 0 through 1 to 0, as will be hereinafter described in greater detail, the terminal Q1 is changed from 1 to 0 at the time the terminals T are changed from 1 to 0, while the terminals Q2, A3, . . . Q9 become 1. Furthermore, when the terminals T of all the flip-flops are changed from 0 through 1, the 0, and then 1 to 0, the terminal Q becoming 1 is shifted rightwardly of the drawing to the adjacent flip-flop and when the terminal Q becoming 1 reaches the terminal Q9, it is then transferred back to the terminal Q1. More particularly, if a clock signal is applied to the terminals T, only one state 1 at the terminals Q circulates in the ring counter circuit 90.

After only the terminal Q1 is set to 1, a square wave of 20kHz, is, for example, applied thereto as the clock signal for 0.5 seconds, the clock signal vanishes owing to the inaccuracy of the duration of 0.5 seconds and of oscillation frequency of 20kHz, and thereafter any one terminal Q becomes 1, but the sequence of which terminal Q becomes 1 is not constant and the sequence becomes different every time this operation is carried out and finally the sequence is approximately random. Thus, a digit is extracted at random.

The operation of the indication or display of a series of four digits to the driver or examinee, which digits will not be repeated in the same series, will now be described as follows.

In the circuit arrangement of the ring counter circuit 90 in FIGS. 5(a) and 5(b), the flip-flop corresponding to the digit once indicated by the indicator, as will be hereinafter described in greater detail, is by-passed by the by-pass circuit, as aforementioned. That is, the flip-flop corresponding to the digit once indicated is removed from the ring counter circuit 90. Therefore, the same digit will not be thereafter repeated by the indicator in any series of four digits.

Then, means for setting any one of the remaining flip-flops within the ring counter circuit 90 to 1 is required. Such a setting of any flip-flop to 1 is effected by a circuit including AND gates 114, 115, 116, 117 and 118.

A reset signal $v$ is fed to a line 119, immediately after the test or examination is started, as will be hereinafter described in great detail. This reset signal $v$ changes from 1 through 0 to 1. As was described heretofore, the terminal Q1 of the flip-flop 91 in the ring counter circuit 90 is set to 1, while the terminals Q of the flip-flops Q1, 93, 95, 97, 99, 101, 103, 105 and 107 are set to 0. If only the terminal Q2 of the flip-flop 93 is, for example, set to 1 and the terminals Q1, Q3, . . . Q9 of the other flip-flops 91, 95, 97, 99, 101, 103, 105 and 107 are set to 0 when the clock signal $x$ is applied to a line 113 for a predetermined period and terminated, as will be described later, a signal A2 fed to the inputs of the AND gates 115, 116 and 117 is changed from 0 to 1 and remains 1 until all four digits have been displayed in the indicator. Thus, the above relationship between the state at the terminal Q2 of the flip-flop 93 and the signal A2 is correspondingly applied to the relationship between a terminal Qn and a signal An. Therefore, the signal An corresponding to the digit once displayed in the indicator is held at 1.

The flip-flop which is set to 1 according to the state of the four digit signals A1, A2, A3 and A4 together with the four AND gates 114, 115, 116 and 117 in the circuit arrangement shown will now be described. A signal $\bar{i}$ is varied from 1 to 0 and applied by way of a line 206 to all of the AND gates 114, 115, 116 and 117. If only the digit signal A1 is supplied to this circuit, the AND gate 114 output is fed to the AND gate 118, and when the signal $v$ is fed to the AND gate 118 its output is fed to the terminal S of the flip-flop 91 with the result that the terminal Q1 of the flip-flop 91 is set to 1.

If the digit signal A2 is fed to the AND gates 115, 116 and 116 in addition to the digit signal A1, the AND gate 115 generates an output connected to the terminal S of the flip-flop 93 with the result that the terminal Q2 of the flip-flop 93 is set to 1.

If the digit signal A3 is fed to the AND gates 116 and 117 in addition to the digit signals A1 and A2, the AND gate 116 generates an output connected to the terminal S of the flip-flop 95 with the result that the terminal Q3 of the flip-flop 95 is set to 1.

If the digit signal A4 is fed to the AND gate 117 in addition to the digit signals A1, A2 and A3, the AND gate 117 generates an output connected to the terminal S of the flip-flop 97 with the result that the terminal Q4 of the flip-flop 97 is set to 1.

These operations are summarized in the following Table 1:

Table 1

| $A_4$ | $A_3$ | $A_2$ | $A_1$ | $Q_4$ | $Q_3$ | $Q_2$ | $Q_1$ |
|---|---|---|---|---|---|---|---|
| 0 | 0 | 0 | 0 | 0 | 0 | 0 | 1 |
| 0 | 0 | 0 | 1 | 0 | 0 | 1 | 0 |
| 0 | 0 | 1 | 0 | 0 | 0 | 0 | 1 |
| 0 | 0 | 1 | 1 | 0 | 1 | 0 | 0 |
| 0 | 1 | 0 | 0 | 0 | 0 | 0 | 1 |
| 0 | 1 | 0 | 1 | 0 | 0 | 1 | 0 |
| 0 | 1 | 1 | 0 | 0 | 0 | 0 | 1 |
| 0 | 1 | 1 | 1 | 1 | 0 | 0 | 0 |
| 1 | 0 | 0 | 0 | 0 | 0 | 0 | 1 |
| 1 | 0 | 0 | 1 | 0 | 0 | 1 | 0 |
| 1 | 0 | 1 | 0 | 0 | 0 | 0 | 1 |
| 1 | 0 | 1 | 1 | 0 | 1 | 0 | 0 |
| 1 | 1 | 0 | 0 | 0 | 0 | 0 | 1 |
| 1 | 1 | 0 | 1 | 0 | 0 | 1 | 0 |
| 1 | 1 | 1 | 0 | 0 | 0 | 0 | 1 |
| 1 | 1 | 1 | 1 | 0 | 0 | 0 | 0 |

The above operations can be represented by the formulae as follows:

$$Q1 = \overline{A1} \quad (3)$$

$$Q2 = A1 \times \overline{A2} \quad (4)$$

$$Q3 = A1 \times A2 \times \overline{A3} \quad (5)$$

$$Q4 = A1 \times A2 \times A3 \times \overline{A4} \quad (6)$$

It will now be appreciated from the Table 1 that any one flip-flop is set from the lower one by avoiding the flip-flop by-passed and accordingly where the terminal Q thereof is set to 1.

In the circuit arrangement of the ring counter circuit 90, if 1 is applied to any one terminal A of the by-pass circuits 92, 94, 96, 98, 100, 102, 104, 106 and 108 from a memory circuit by way of any one of lines 132, 134, 136, 138, 140, 142, 144, 146 and 148 connected thereto in FIGS. 8 and 9(a) and 9(b), the corresponding flip-flop of the flip-flops 91, 93, 95, 97, 99, 101, 103, 105 and 107 is by-passed by the by-pass circuit thus operated. Furthermore, any one of the terminals Q1, Q2, Q3, Q4, Q5, Q6, Q7, Q8 and Q9 of the respective flip-flops 91, 93, 95, 97, 99, 101, 103, 105 and 107 thus operated applies 1 by way of the corresponding one of lines 132, 134, 136, 138, 140, 142, 146 and 148 to the corresponding memory in the memory circuit as will be hereinafter described in greater detail.

Reference is now made to FIG. 7, which shows the circuit arrangement of the ring counter control circuit in the apparatus of the present invention for controlling the ring counter circuit 90.

The signal of square waveform $f$ in FIG. 3(a) is applied from the astable multivibrator 60 in FIG. 4 by way of the line 61 to one input of an AND gate 201, and the signal of waveform $g$ in FIG. 3(a) is connected by the line 78 from the flip-flop 72 in the counting circuit FIG. 4 to the other input of the AND gate 201. Therefore, the AND gate 201 passes signals of waveform $h$ as designated in FIG. 3(b) via its output line 202 to the input of a second monostable multivibrator 203, which operates such that when the input waveform h changes from 0 to 1, it generates an output 1 for a predetermined duration from the time the input waveform h changes from 0 to 1. A line 204 leads from the output of the monostable multivibrator 203 to an inverter 205 which inverts the input and its output as designated by $\bar{i}$ in FIG. 3(b) is fed to a line 206.

The output signal of waveform h in FIG. 3(b) from the AND gate 201 is also connected to one input of an AND gate 207 by the line 202, and the output signal of waveform i in FIG. 3(b) of the inverter 205 is fed via the line 206 to the other input of the AND gate 207. Therefore, the AND gate 207 passes a signal of waveform j as shown in FIG. 3(b) to its output line 208.

The output signal of waveform j from the AND gate 207 is fed via the line 208 to the input of a third monostable multivibrator 209, which operates such that when the input signal of waveform j changes from 1 to 0, it generates 1 at its output designated by n in FIG. 3(b) and fed to a line 211 as for a predetermined duration from the time when the input signal of waveform j changes from 1 to 0.

The output signal of waveform j from the AND gate 207 is also applied via the line 208 to the input of a second astable or free-running multivibrator 210, which generates or oscillates square waveforms at its output fed to a line 212 only when its input becomes 1, the oscillation frequency of which output is preferably over 2kHz as illustrated by u in FIG. 3(b).

The output signal of waveform r from the inverter 48 in the control circuit of FIG. 2 is fed via the line 49 to one input of an AND gate 213, and the output signal of waveform q in FIG. 3(a) from the AND gate 66 of the counting circuit in FIG. 4 is connected via the line 70 to the other input of the AND gate 213. Therefore, the AND gate 213 passes the signal of waveform v as illustrated in FIG. 3(b) to its output 119 in FIG. 5(a). The output signal of waveform v from the AND gate 213 is fed to all reset (R) terminals of the flip-flops 93, 95, 97, 99, 101, 103, 105 and 107, which are accordingly reset at the time T2 in FIG. 3(b) and accordingly when the signal of waveform v goes from 1 to 0 the terminals Q2, Q3, ... Q9 of the flip-flops 93, 95, 97, 99, 101, 103, 105 and 107 are reset to 0, while the terminal Q1 of the flip-flop 91 is set to 1. The time T3 of the waveform v in FIG. 3(b) will be hereinafter described in greater detail.

The output signal of waveform f in FIG. 3(a) of the monostable multivibrator 60 of the counting circuit of FIG. 4 is fed via the line 61 to one input of an AND gate 214, and the output signal of waveform k from the flip-flop 73 of the counting circuit of FIG. 4 is fed via the line 79 to the other input of the AND gate 214. Consequently, the AND gate 214 passes a signal of waveform w as depicted in FIG. 3(b) to its output line 215 in FIG. 7.

This output signal of waveform w of the AND gate 214 is fed via the line 215 to one input of an OR gate 216, and the output signal of waveform u in FIG. 3(b) of the astable multivibrator 210 is fed via the line 212 to the other input of the OR gate 216. Therefore, the OR gate 216 passes a signal of waveform x as illustrated in FIG. 3(b) to its output line 113 in FIGS. 5(a) and 7. This signal of waveform x is the clock signal coupled to all terminals T of the flip-flops 91, 93, 95, 97, 99, 101, 103, 105 and 107 of the ring counter circuit 90 in FIG. 5(a) and 5(b) as was described heretofore. The signal of waveform x before the time T4 in FIG. 3(b) is the clock signal for displaying digits in the indicator at random as was described heretofore. The signal of waveform x after the time T4 in FIG. 3(b) will be hereinafter described in greater detail.

Referring now to FIGS. 8 and 9(a) and 9(b), which show the random memory circuit of the device of the present invention, the random memory circuit 227 has, as illustrated schematically in FIG. 8, nine memories from first to ninth 231, 232, . . . 239, respectively. These memories correspond to the respective flip-flops 91, 93, 95, 97, 99, 101, 103, 105 and 107 of the ring counter circuit 90 in FIG. 5(a) and 5(b). Any different four numbers from 1 to 9 selected randomly as will be hereinafter described in greater detail are displayed by the indicator while the signal of waveform g from the flip-flop 72 is 1 and the signal of waveform h from the AND gate 201 is 0. At this time, any one of the terminals Q1 to Q9 of the flip-flops 91, 93, 95, 97, 99, 101, 103, 105, and 107 of the ring counter circuit 90 in FIG. 5(a) and 5(b) becomes 1. This 1 state is memorized by the corresponding memory in such a manner that a flip-flop of the corresponding memory in the random memory circuit 227 is set to 1 at its terminal Qn'.

The respective memories 231, 232, . . . 239 have flip-flops 251, 261, 271, 281, 291, 301, 311, 321 and 331, respectively. The output signal of waveform r in FIG. 3(a) of the inverter 48 of the control circuit in FIG. 2 is fed to all reset (R) terminals of the flip-flops 251, 261, 271, 281, 291, 301, 311, 321 and 331 via the line 49 to reset all terminals Qn' such as Q1', Q2', ... Q9' of the flip-flops 251, 261, 271, 281, 291, 301, 311, 321 and 331, respectively to 0 at the time T1 of the signal of waveform r in FIG. 3(a).

The operation of the random memory circuit 227 will now be described in cases, for example, where the state that the terminal Q1 of the flip-flop 91 of the ring counter circuit 90 in FIG. 5(a) and 5(b) is 1 is memorized by the first memory 231 while any four different digits are displayed in the indicator.

The signal from the terminal Q1 of the flip-flop 91 is fed via the line 131 to one input of an AND gate 253 of the first memory 231, wherein this signal from the terminal Q1 of the flip-flop 91 becomes 1 while any digit is displayed in the indicator as will be hereinafter described, and the signal of waveform n in FIG. 3(b) from the monostable multivibrator 209 of the ring counter control circuit in FIG. 7 is fed via the line 211 to the other input of the AND gate 253, and the output signal from the AND gate 253 fed to the set (S) terminal of the flip-flop 251 changes from 1 to 0, when the signal of waveform n in FIG. 3(b) from the monostable multivibrator 209 of the ring counter control circuit in FIG. 7 changes from 1 to 0, and, at this time, the terminal Q1' of the flop-flop 251 is set to 1, while any digit is displayed in the indicator as will be described later. However, when the signal at the terminal Q1 of the flip-flop 91 is 0, where the digit is not displayed in the indicator even if the signal of waveform n in FIG. 3(b) from the monostable multivibrator 209 of the ring counter control circuit in FIG. 7 changes from 1 to 0, the terminal Q1' of the flip-flop 251 of the memory 231 is not set to 1. Thus, the state of the ring counter circuit is memorized by the random memory circuit in FIG. 9(a) and 9(b).

Similarly, the signals from the respective terminals Q2, Q3, ... Q9 of the ring counter circuit 90 in FIG.

5(a) and 5(b) are coupled by way of the lines 133, 135, 137, 139, 141, 143, 145 and 147, respectively to one of the respective inputs of AND gates 263, 273, 283, 293, 303, 313, 323 and 333, respectively of the second, third, . . . ninth memories 232, 233, . . . 239, and the signal of the waveform n in FIG. 3(b) from the monostable multivibrator 209 of the ring counter control circuit in FIG. 7 is fed via the line 211 to the other inputs of the AND gates 263, 273, 283, 293, 303, 313, 323 and 333, respectively. Therefore, the output signals of the AND gates 263, 273, 283, 293, 303, 313, 323 and 333, respectively fed to the set (S) terminals of the flip-flops 261, 271, 281, 291, 301, 311, 321 and 331 go from 1 to 0, when the signal of waveform n in FIG. 3(b) from the monostable multivibrator 209 of the ring counter control circuit in FIG. 7 changes from 1 to 0, and, at this time, the terminals Q2', Q3', . . . Q9' of the flip-flops 261, 271, 281, 291, 301, 311, 321 and 331 are set to 1, while any digit is displayed in the indicator.

The output signal of waveform k in FIG. 3(a) from the flip-flop 73 of the counting circuit of FIG. 4 is fed via the line 79 to the input of an inverter 244, which inverts the input signal of waveform k to an output signal of waveform $\bar{k}$ which output line 243, and the waveform $\bar{k}$ therefrom is fed via the line 243 to one input of an AND gate 254 of the first memory 231, wherein this waveform becomes 1 while any four digits are displayed in the indicator. Further, the signal from the terminal Q1' of the flip-flop 251 is fed via a line 256 to the other input of the AND gate 254 of the first memory 231, where the signal at the terminal Q1 of the flip-flop 251 becomes 1 while any digit is displayed in the indicator. Therefore, in such state, the AND gate 254 passes the signal 1 by way of the line 132 to the terminal A of the by-pass circuit 92 which operates to by-pass the flip-flop 91 of the ring counter circuit 90 as was described heretofore. Therefore, any four different digits can be displayed in the indicator to the driver or examinee as will be described later.

Similarly, the signal of waveform $\bar{k}$ from the output of the inverter 244 is also applied by way of the line 243 to the respective one inputs of AND gates 264, 274, 284, 294, 304 314, 324 and 334 of the second, third, . . . ninth memories 232, 233, . . . 239, wherein this waveform becomes 1 while any four digits are displayed in the indicator for the driver or examinee, and the signals from the terminals Q2', Q3', . . . Q9' of the flip-flops 261, 271, 281, 291, 301, 311, 321 and 331, respectively are fed via lines 266, 276, 286, 296, 306, 316, 326 and 336 to the other inputs of the AND gates 264, 274, 284, 294, 304, 314, 324 and 334 of the second, third, . . . ninth memories, respectively, wherein the signals s at the terminals Q2', Q3', . . . Q9' of the flip-flops 261, 271, 281, 291, 301, 311, 321 and 331 become 1 while any digit is displayed in the indicator. Therefore, in the memory corresponding to the digit as dispalyed in the indicator, the corresponding AND gate of the AND gates 264, 274, 284, 294, 304, 314, 324 and 334 passes the signal 1 by way of the corresponding line of the lines 134, 136, 138, 140, 142, 144, 146 and 148 to the terminal A of the corresponding by-pass circuit of the by-pass circuits 94, 96, 98, 100, 102, 104, 106 and 108 to by-pass the corresponding flip-flop of the flip-flops 93, 95, 97, 99, 101, 103, 105 and 107 of the ring counter circuit 90 as was described heretofore.

The circuit arrangement and carrying out the examination to check whether the driver or examinee responds to the testing by the device of this invention correctly or not, will now be described.

Numeral 407 designates a push-button switch which is depressed by the driver or eaminee when the same digit as that displayed in the indicator and memorized by the driver or examinee reappears. This push-botton switch 407 is grounded at one end and is connected at the other to the input of a fourth monostable multivibrator 408.

For example, when the digit 1 is displayed in the indicator, if the driver or examinee depresses the push-button switch 407 as designated by a waveform z in FIG. 3(b), where the digit 1 is depressed, the multivibrator 408 generates the waveform as designated by $\alpha$ in FIG. 3(b) at its output line 245. When the digit 1 is displayed in the indicator, the terminal Q1 of the flip-flop 91 of the ring counter circuit 90 becomes 1 as illustrated by $\beta$ in FIG. 3(b). The output signal of waveform k from the flip-flop 73 of the counting circuit in FIG. 4 is coupled by way of the line 79 to one input of an AND gate 252 of the first memory 231 of the random memory circuit 227, and the signal of waveform $\beta$ from the terminal Q1 of the flip-flop 91 of the ring counter circuit is applied by way of the line 131 to the other input of the AND gate 252 of the first memory 231. Therefore, the AND gate 252 generates a signal of a waveform as designated by $\beta$ in FIG. 3(b) after the time T3 to its output line 258, and the signal of waveform $\beta$ from the output of the AND gate 252 is fed via the line 258 to the terminal T of the flip-flop 251 as a clock signal. On the other hand, the terminals J and K of the flip-flop 251 are shortcicuited. In this state, when the signal of waveform $\beta$ from the output of the AND gate 252 to the terminal T of the flip-flop 251 is 1, if the output of the monostable multivibrator 408 once becomes 1, which is fed to the terminals J and K of the flip-flop 251 via the line 245, when the signal of waveform $\beta$ to the terminal T of the flip-flop 251 is changed from 1 to 0, the state at the terminal Q1' of the flip-flop 251 is changed and accordingly the state at the terminal Q1 of the flip-flop 91 of the ring counter circuit 90 is changed at the time T6 in FIG. 3(b) while the input to the terminal T of the flip-flop 251 has the waveform as designated by $\beta$ in FIG. 3(b) and the input to the terminals J and K of the flip-flop 251 is in the waveform as designated by $\alpha$ in FIG. 3(b). If the driver or examinee depresses the push-button switch 407 correctly, where the terminal Q1' of the flip-flop 251 is 1 before depression by the driver or examinee, the state of the terminal Q1' of the flip-flop 251 becomes 0. If the driver or examinee does not depress the push-button switch 407 correctly, where the terminal Q1' of the flip-flop 251 is 0, before the depression, the state of the terminal Q1' of the flip-flop 251 becomes 1.

Similarly, when any one of the digits 1 to 9 is displayed in the indicator, if the driver or examinee depresses the push-button switch 407, the corresponding terminal Qn of the corresponding flip-flop of the flip-flops 91, 93, 95, 97, 99, 101, 103, 105 and 107 of the ring counter circuit 90 becomes 1. The output waveform k from the flip-flop 73 of the counting circuit in FIG. 4 is coupled by way of the line 79 to any one input of the corresponding AND gate of AND gates 262, 272, 282, 292, 302, 312 and 332 of the corresponding memory of the memories 231, 232, . . . 239 of the random memory circuit 227, and the waveform from the corresponding terminal Qn of the corresponding flip-flop of the flip-flop 91, 93, 95, 97, 99, 101, 103, 105 and 107 of the ring counter circuit is applied by way of the corresponding line of the lines 131, 133, 135, 137, 139, 141, 143, 145 and 147 to the other input of the corresponding AND gate 252, 262, 272, 282, 292, 302, 312, 322 or 332 of the corresponding memory 231, 232, . . . 239, respectively. Therefore, the corresponding AND gate 252, 262, 272, 282, 292, 302, 312, 322 or 332 passes the corresponding waveform signal similarly, and the waveform signal from the output of the corresponding AND gate 252, 262, 272, 282, 292, 302, 312, 322 or 332 is fed via the corresponding line 258, 268, 278, 288, 298, 308, 318, 328 or 338 to the terminal T of the corresponding flip-flop 251, 261, 271, 281, 291, 301, 311, 321 or 331 as a clock signal. On the other hand, the terminals J and K of all flip-flops 251, 261, 271, 281, 291, 301, 311, 321 and 331 are shortcircuited. In this state, when the waveform signal from the output of the corresponding AND gate 252, 262, 272, 282, 292, 302, 312, 322 or 332 to the terminal T of the corresponding flip-flop 251, 261, 271, 281, 291, 301, 311, 321 or 331 is 1, if the output of the monostable multivibrator 408 once becomes 1, which is fed to the terminals J and K of the corresponding flip-flop 251, 261, 271, 281, 291, 301, 311, 321 or 331 via the line 245, when the waveform signal to the terminal T of the corresponding flip-flop 251, 261, 271, 281, 291, 301, 311, 321 or 331 is varied from 1 to 0, the state at the corresponding terminal Qn' of the corresponding flip-flop 251, 261, 271, 281, 291, 301, 311, 321 or 331 is varied and accordingly the state at the terminal Qn of the corresponding flip-flop 91, 93, 95, 97, 99, 101, 103, 105 or 107 of the ring counter circuit 90 is varied similarly. If the driver or examinee depresses the push-button switch 407 correctly, where the terminal Qn' of the corresponding flip-flop 251, 261, 271, 281, 291, 301, 311, 321 or 331 is 1 before the depression by the driver or examinee, the state at the terminal Qn' of the corresponding flip-flop 251, 261, 271, 281, 291, 301, 311, 321 or 331 becomes 0. If the driver or examinee does not depress the push-button switch 407 correctly, where the terminal Qn' of the corresponding flip-flop 251, 261, 271, 281, 291, 301, 311, 321 or 331 is 0, before the depression, the state of the terminal Qn' of the corresponding flip-flop 251, 261, 271, 281, 291, 301, 311, 321 or 331 becomes 1.

Consequently, if the driver or examinee depresses the push-button switch 407 for every digit correctly, the state of all the terminals Q1', Q2', . . . Q9' of the flip-flops 251, 261, 271, 281, 291, 301, 311, 321 and 331 becomes 0. However, if the driver or examinee once depresses erroneously the push-button switch 407, the state of the corresponding terminal Qn' of the flip-flops 251, 261, 271, 281, 291, 301, 311, 321 and 331 becomes 1.

The operatiion of the monostable multivibrator 408 used herein will now be described as follows.

Assuming that the state at the line 245 becomes 1 when the push-button switch 407 is depressed without using the monostable multivibrator 408, the signal at the line 245 becomes as designated by z in FIG. 3(b). If thus operated, when the digits 1 and 2 are substantially displayed in the indicator, it effects to depress both digits 1 and 2 erroneously. When the multivibrator 408 is thus used, no such mistake takes place.

Reference is now made to FIG. 10, which shows the circuit arrangement of the indicator in the device of the present invention.

Numeral 401 illustrates a digit indicator, which has input terminals Q1a, Q2a, . . . Q9a connected to the respective terminals Q1, Q2, . . . Q9 of the flip-flops 91, 93, 95, 97, 99, 101, 103, 105 and 107, respectively, of the ring counter circuit 90. In operation of the digit indicator thus connected, when any one of the terminals Q1, Q2, . . . Q9 of the flip-flops becomes 1, for example, Q3 becomes 1, the digit 3 appears in a digit indicating window 402 of the digit indicator 401.

The output signal of waveform h in FIG. 3(b) of the AND gate 201 of the ring counter control circuit in FIG. 7 is fed via the line 202 to the input of an inverter 403, which inverts the input, and the output of the inverter 403 is applied to one input of an AND gate 404. The output signal of waveform g in FIG. 3(a) of the flip-flop 72 of the counting circuit in FIG. 4 is fed via the line 78 to the other input of the AND gate 404. The output signal of the AND gate 404 is connected to one input of an OR gate 405, and the output signal of waveform k in FIG. 3(a) of the flip-flop 73 of the counting circuit in FIG. 4 is fed the other input of the OR gate 405. Therefore, the OR gate 405 passes a signal of waveform y shown in FIG. 3(b) to its output line 406 which is coupled to a terminal (no numeral) of the digit indicator 401. In such circuit arrangement of the digit indicator thus connected, in the state that the signal waveform y becomes 1 before the time point T5 in FIG. 3(b), four different digits are displayed at the digit indicating window 402 sequentially. The operation after the time point 5 in FIG. 3(b) will be hereinafter described in greater detail.

The operation of the digit indicator 401 for displaying the digits 1, 2, . . . 9 at predetermined intervals sequentially at the digit display window will now be described as follows.

In the digit indicator 401, when the signal 1 is fed to the terminal (no numeral) of the indicator 401, the digit is displayed at the digit indicating window 402, but when the signal 0 is applied to the unnumbered terminal of the indicator 401, even if any one of the signals from the terminals Q1, Q2, . . . Q9 of the flip-flops 91, 93, 95, 97, 99, 101, 103, 105 and 107, respectively, is coupled to the corresponding terminal of the terminals Q1a, Q2a, . . . Q9a of the indicator 401, no digit is displayed in the digit window 402.

Therefore, when the signal 1 is fed to the unnumbered terminal of the digit indicator 401, if the signal 1 is fed sequentially to the termiinals Q1a, Q2a, Q3a, . . . Q0a from the terminals Q1, Q2, . . . Q9 of the flip-flops 91, 93, 95, 97, 99, 101, 103, 105 and 107, respectively of the ring counter circuit in FIGS. 5(a) and (b), the digits 1, 2, . . . 9 are displayed in sequence by the indicator 401.

Since the signal of waveform v in FIG. 3(b) from the AND gate 213 of the ring counter control circuit in FIG. 7 is directly fed to the respective reset (R) terminals of the flip-flops 93, 95, 97, 99, 101, 103, 105 and 107 of the ring counter circuit in FIGS. 5(a) and 5(b) but not to the reset (R) terminal of the flip-flop 91, these flip-flops 93, 95, 97, 99, 101, 103, 105 and 107 are reset at the time T3 of the signal of waveform v in FIG. 3(b) with the result that the terminals Q2a, Q3a, . . . Q9a of the indicator 401 become also 0. Furthermore, since the signal of waveform v in FIG. 3(b) is fed from the output of the AND gate 213 of the ring counter control circuit in FIG. 7 through the AND gate 118 of the ring counter circuit in FIG. 5(a) to the set (S) terminal of the flip-flop 91 of the ring counter circuit in FIG. 5, the terminal Q1 of the flip-flop 91 is set to 1 at the time T3 in FIG. 3(b). As the unnumbered terminal of the indicator 401 becomes 1 after the time T3 as shown by y in FIG. 3(b), the digit 1 is indicated at the digit display window of the digit indicator 401 between the times T3 to T6 in FIG. 3(b). Then, since the signal of waveform k in FIG. 3(a) becomes 1 after the time T3 in FIG. 3(b), the output signal of waveform $\overline{k}$ of the inverter 244 of the random memory circuit 227 to be fed to the respective inputs of the AND gates 254, 264, 274, 284, 294, 304, 314, 324 and 334 of the respective memories 231, 232, . . . 239 becomes 0. Therefore, the outputs of the respective AND gates 254, 264, 274, 284, 294, 304, 314, 324 and 334 coupled to the terminals A of the respective by-pass circuits 92, 94, 96, 98, 100, 102, 104, 106 and 108 of the ring counter circuit 90 in FIGS. 5(a) and 5(b) become 0. Accordingly, the flip-flops 91, 93, 95, 97, 99, 101, 103, 105 and 107 of the ring counter circuit in FIGS. 5(a) and 5(b) are not by-passed by these by-pass circuits after the time point T3 in FIG. 3(b).

Then, since the signal of waveform x in FIG. 3(b) from the OR gate 216 of the ring counter control circuit in FIG. 7 is fed via the line 113 to all terminals T of the flip-flops 91, 93, 95, 97, 99, 101, 103, 105 and 107 of the ring counter circuit in FIGS. 5(a) and 5(b) every time when the signal waveform x changes from 1 to 0, the terminal Qn of the terminals Q1, Q2, . . . Q9 of the flip-flops 91, 93, 95, 97, 99, 101, 103, 105 and 107 becomes 1 and is, in turn, transferred from one flip-flop to another one by one. More particularly, the signal state 1 of the terminal Q1 is transferred to the terminal Q2 at the time point T6 in FIG. 3(b) in the ring counter circuit in FIGS. 5(a) and 5(b). Similarly thereafter, the signal state 1 is thus transferred. As the state 1 is thus transferred, the digits 1, 2, . . . 9 are subsequently displayed at the window 402 of the digit indicator 401 in sequence.

Referring now to FIG. 11, which shows the circuit arrangement of the examining circuit in the device of the present invention, a numeral 421 designates an AND gate, and the terminals $\overline{Q1}'$, $\overline{Q2}'$, . . . $\overline{Q9}'$ of the flip-flops 251, 261, 271, 281, 291, 301, 311, 321 and 331 of the random memory circuit in FIGS. 9(a) and 9(b) are coupled to the respective input terminals $\overline{Q1}'a$, $\overline{Q2}'a$, . . . $\overline{Q9}'a$ of the AND gate 421. Therefore, the output of the AND gate 421 becomes 1, when all the inputs to the terminals Q1'a, Q2'a, . . . Q9'a of the AND gate 421 becomes 1. The output of the AND gate 421 is coupled by way of a line 422 to one input of an AND gate 423, and the output signal of waveform d in FIG. 3(a) of the amplifier 44 of the control circuit in FIG. 2 is fed via the line 45 to another input of the AND gate 423, and the output signal of waveform $\overline{s}$ of the inverter 80 of the counting circuit in FIG. 4 is coupled by way of the line 81 to the third input of the AND gate 423.

When the driver or examinee depresses the pushbutton switch 407 in FIG. 9(a) correctly so that the output of the AND gate 421 becomes 1, the AND gate 423 passes a signal of waveform as desingated by γ in FIG. 3(b) to its output line 425. Accordingly, when the driver or examinee responds to operations of the present device correctly and accordingly passes the examination by this device, the output of the AND gate 423 becomes high voltage 1. This high voltage 1 thus generated is fed through a line 425 and via a diode 426 to a relay coil 427 to energize the relay 427 in order to close its switch 428. Thus, power from a source (not shown) is applied by way of the switch 428 of the relay 427 and a resistor 429 connected in series with the switch 428 to the relay coil 427 to self-hold the relay 427 with the result that even if the high voltage 1 at the output line 425 of the AND gate 423 is removed, the relay coil 427 remains continuously energized. Therefore, the other switch 33 in the control circuit of FIG. 2 of the relay 427 is also energized thereby with the result that power from the source is supplied by way of the switch 33 of the relay 427 to the electric system of the vehicle when the driver or examinee passes the examination by the present device, and the transmission can be shifted from the neutral or parking position to drive positions without the engine being shut off to enable the driver to drive the vehicle.

The operation of the AND gate 423 where the signal of waveform d from the amplifier 44 of the control circuit in FIG. 2 is fed to one input of the AND gate 423 by way of the line 45 will now be described as follows.

The state of the circuit arrangement before the time T1 in FIG. 3(a) does not yet complete the setting and resetting of the respective circuits of the device of this invention, and accordingly there is eventually a possibility that the state of both lines 422 and 81 become 1. Accordingly, until all resettings of the respective circuits of the device are completed, the signal of waveform d in FIG. 3(a) may become 0 and fed via the line 45 to one input of the AND gate 423.

Referring still to FIG. 11, which also shows a signal holding circuit for holding the signal that the driver or examinee passed the examination by this device even if he once opens the ignition switch 32 in FIG. 2 within a predetermined time period from the time the ignition switch 32 is opened without having to pass the examination by the device once more.

The output of the diode 426 is also fed via a line 465 to a diode 463 and also to the emitter of a transistor 461. The output of the diode 463 is applied to a condenser 464 and also to the base of the transistor 461 by way of a resistor 462. The other end of the condenser 464 is grounded. The collector of the transistor 461 is connected to the power source of the vehicle through the ignition switch 32 in the control circuit in FIG. 2.

In operation of the circuit arrangement with the signal holding circuit, in the case that the driver or examinee passed the examination by this device or that the vehicle is running, in the line 465 from the output of the AND gate 423 via the diode 426 the voltage becomes a high 1, and therefore, the condenser 464 is charged via the diode 463. If the ignition switch 32 of the control circuit in FIG. 2 is opened in such case, the relay coil 427 is deenergized, with the result that the switch 428 of the relay 427 is also opened. Then, if the ignition switch 32 in FIG. 2 is again closed within a predetermined time, a small current flowing between the base and emitter of the transistor 461 via the resistor 462 from the electric charge at the condenser 464, is amplified by the transistor 461 when an electric electric energy is applied to the collector of the transistor 461 from the power souce of the vehicle with the result that the collector current of the transistor 461 flows through the relay coil 427 so as to energize the relay 427 and thus to close its switch 428 to self-hold the relay 427 and accordingly the switch 33 of the relay 427 is also closed to supply power to the electric system of the vehicle.

Reference is now to FIG. 12, which shows the circuit arrangement of the constant voltage cut-off circuit in the device of the present invention for shutting off the supply of the constant voltage to the device of the present invention after the examination.

This constant voltage cut-off circuit has a flip-flop 441, and the output signal of waveform r in FIG. 3(a) of the inverter 48 of the control circuit in FIG. 2 is coupled by way of the line 49 to the reset (R) input of the flip-flop 441 with the result that the flip-flop 441 is reset by the signal of waveform r at the time T1 in FIG. 3(a) so that the terminal Q of the flip-flop 441 becomes 0. And, the output signal of waveform $\bar{s}$ from the inverter 80 of the counting circuit in FIG. 4 is fed via the line 81 to the set (S) input of the flip-flop 441. When the set (S) terminal changes from 1 to 0, the terminal Q of the flip-flop 441 is set to 1, and accordingly the terminal Q of the flip-flop 441 becomes 1 at the time T7 of the signal of waveform s in FIG. 3(a). The terminal Q of the flip-flop 441 is connected to one input of an AND gate 442, and the signal of waveform d in FIG. 3(a) from the amplifier 44 of the control circuit in FIG. 2 is fed via the line 45 to the other input of the AND gate 442. The AND gate 442 passes the signal 1 to its output line 444 and accordingly to a relay coil 443 so as to energize the relay 443 with the result that the normally closed switch 38 in the control circit in FIG. 2 of the relay 443 is opened so that the relay coil 37 is deenergized so as to open its switch 39 and thus to cut off the power to the constant voltage circuit 40 in the control circuit in FIG. 2 and accordingly to shut it off at the time T7 of the signal of waveform s in FIG. 3(a).

The operation of the AND gate 442 of this circuit arrangement will now be described as follows.

In cases where the terminal Q of the flip-flop 441 is accidentally set to 1 since the flip-flop 441 is completely reset at the time point T1 in FIG. 3(a), if the terminal Q of the flip-flop 441 is directly coupled to the relay coil 443, the relay 37 of the control circuit in FIG. 2 cannot be self-held because the normally closed switch 38 of the relay 443 is opened when the test starting push-button STB is depressed. Therefore, as designated by d in FIG. 3(a), the output of the AND gate 442 fed to the relay coil 443 is 0 until all the circuits in the apparatus are reset and accordingly 0 is applied to the AND gate 442 from the amplifier 44 of the control circuit in FIG. 2.

Thus, in operation of the device for preventing drunken driving of a vehicle of this invention, thus connected and arranged, four different digits are indicated in the digit indicator in random sequence one at a time at a predetermined interval for the driver or examinee to memorize. Then, the digits 1, 2, ... 9 are one at a time indicated by the same digit indicator in numerical order and at a predetermined interval. The driver or examinee depresses the push-button 407 every time one of the memorized digits previously indicated at the digit indicator reappears. If the driver or examinee depresses the push-button 407 correctly, the vehicle becomes drivable.

It will be appreciated from the foregoing description that the initial different digits indicated by the digit indicator may not always be four, but may be any number, and may not always be indicated by only one character. It will also be appreciated that the digits 1, 2, .. . 9 indicated subsequently thereafter may not always be indicated in such manner, but may be indicated in another than the aforementioned order and number, if the latter indication of the number if related to the previous indication of the four or other numbers within the scope of the present invention.

It should also be understood from the foregoing description that there may be two digit indicators instead of one as aforementioned to indicate the initial four digits and the subsequent sequential indication of the digits 1, 2, ... 9 for the driver or examinee to respond to the examination. It should also be understood that instead of digits, any characters or symbols can be used. It should also be understood that instead of isolating the electric system of the vehicle, a warning circuit and means can be used for indicating externally when the driver or examinee is not fit to drive.

In summary it should be understood from the afore description that the device for preventing drunken driving of the vehicle of the invention has many advantageous features such as the few digits required and that only one push-button is sufficient to carry out the examination to accurately evaluate the condition of the driver or examinee. Thus the invention provides a device which requires less space than prior art devices.

What is claimed is:

1. A vehicle operation inhibitor control system for a vehicle having an engine, an electric power source and an electric system for controlling the engine operation when energized by said electric power source, wherein said inhibitor control system comprises:

connect means for connecting said electric power source to said electric system when said connect means is energized;

a display having a single screen for displaying a character on the single screen in response to a character signal applied thereto when said display is triggered by an external trigger signal;

control means for consecutively applying a first group of character signals respectively representing a first group of characters different from one another to said display while applying a trigger signal to said display during a first time period, and applying to said display a second group of character signals respectively representing a second group of characters including at least one character in addition to said first group of characters during a second time period later than said first period; and detect means operable by the vehicle operator for energizing said connect means at each time when one character of said first group is displayed by said display during said second period.

2. A vehicle operation inhibitor control system according to claim 1, in which said display includes means for receiving a plurality of input signals and means for receiving an external trigger signal to display a character on the screen according to a character signal applied thereto when it receives an external trigger pulse signal.

3. A vehicle operation inhibitor control system according to claim 2, in which said control means includes a multi-stage ring counter having a corresponding by-pass circuit cooperative with each stage thereof for by-passing a stage when the corresponding by-pass circuit is energized, a set terminal at several stages thereof and a trigger terminal common to all of the stages; means for applying the output of said ring counter to said means for receiving input signals of said display; a high frequency trigger pulse generator for producing a high frequency trigger pulse train; a low frequency trigger pulse generator for producing a low frequency trigger pulse train; a first gate pulse generator for producing a first gate pulse having a duration of said first period; a second gate pulse generator for producing a second gate pulse having a duration of said second period; memory means for memorizing therein the characters displayed by said display and energizing selected ones of the by-pass circuits according to the memorized characters; set means for applying a logic 1 level signal to one of said set terminals at the beginning of each low frequency trigger pulse; display actuating means for applying the inverse of said low frequency trigger pulse train to said means for receiving a trigger signal of the display when the actuating means is energized by said first gate pulse and for applying said second gate pulse to said means for receiving a trigger signal of the display; ring counter trigger means for applying said high frequency pulse train modulated by said low frequency pulse train to said trigger terminal of said ring counter when the ring counter trigger means is energized by said first gate pulse and for applying said low frequency pulse train to said trigger terminal of the ring counter when it is energized by said second gate pulse.

4. A vehicle operation inhibitor control system according to claim 3, in which said low frequency trigger pulse generator is a astable multi-vibrator.

5. A vehicle operation inhibitor control system according to claim 3, in which said high frequency trigger pulse generator is a astable multivibrator for developing an oscillatory output signal when enegized; and said ring counter trigger means includes a first AND gate receptive of said low frequency trigger pulse train and said first gate pulse, a monostable multivibrator receptive of the first AND gate output for producing a short pulse when it is energized by each of the low frequency trigger pulses passed by said first AND gate; an inverter for inverting the output of said monostable multivibrator; a second AND gate receptive of the inverter output of said monostable multivibrator and the low frequency trigger pulse train passed through said first AND gate for applying an output to said astable maultivibrator; a third AND gate receptive of said low frequency trigger pulse train and said second gate pulse, and an OR gate receptive of the output signal from said third AND gate and said astable multivibrator for applying an output to the trigger terminal of the ring counter.

6. A vehicle operation inhibtior control system according to claim 3, in which said memory means includes pulse generating means responsive to the low frequency trigger pulses for producing a memory pulse at the trailing portion of each low frequency trigger pulse; a number of flip-flop circuits equal to the number of stages of said ring counter; a plurality of AND gates each corresponding to one of said flip-flop circuits for connecting the output terminal of the corresponding stage of said ring counter to the set terminal of the corresponding flip-flop circuit when triggered by a memory pulse; and means for applying the memory pulses to the plurality of AND gates.

7. A vehicle operation inhibitor control system according to claim 6, in which said detect means includes a plurality of AND gate each corresponding to one of said flip-flop circuits for connecting the trigger terminal of said flip-flop circuit to the output of the corresponding stage of said ring counter when triggered by said second gate pulse; means for applying said second gate pulse to said plurality of AND gates included in said detect means; a pulse generator manually operable for producing a pulse and for applying said pulse to J and K terminals of all of said flip-flop circuits, and means for energizing said connect means when said flip-flop circuits are all reset by the pulse.

* * * * *